(12) United States Patent
Lehtovirta et al.

(10) Patent No.: US 11,997,078 B2
(45) Date of Patent: May 28, 2024

(54) SECURED AUTHENTICATED COMMUNICATION BETWEEN AN INITIATOR AND A RESPONDER

(71) Applicant: Telefonaktiebolaget LM Ericsson (publ), Stockholm (SE)

(72) Inventors: Vesa Lehtovirta, Espoo (FI); Mohit Sethi, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 573 days.

(21) Appl. No.: 17/264,527

(22) PCT Filed: Aug. 2, 2018

(86) PCT No.: PCT/EP2018/071045
§ 371 (c)(1),
(2) Date: Jan. 29, 2021

(87) PCT Pub. No.: WO2020/025138
PCT Pub. Date: Feb. 6, 2020

(65) Prior Publication Data
US 2021/0297400 A1    Sep. 23, 2021

(51) Int. Cl.
*H04L 9/40*    (2022.01)

(52) U.S. Cl.
CPC ............ *H04L 63/08* (2013.01); *H04L 63/065* (2013.01)

(58) Field of Classification Search
CPC . H04L 63/065; H04L 63/0869; H04L 9/3273; H04L 63/08; H04L 63/162; H04W 84/12; H04W 12/06

(Continued)

(56) References Cited

U.S. PATENT DOCUMENTS 11,140,157 B1 * 10/2021 Xia ..................... H04L 63/0853
2005/0149732 A1    7/2005 Freeman et al.
(Continued)

FOREIGN PATENT DOCUMENTS

CN    101159549 A    4/2008
CN    101814991 A    8/2010

OTHER PUBLICATIONS

3GPP, "3rd Generation Partnership Project; Technical Specification Group Services and System Aspects; Security architecture and procedures for 5G system (Release 15)", 3GPP TS 33.501 V15.1.0, Jun. 2018, 1-152.

(Continued)

*Primary Examiner* — Benjamin A Kaplan
(74) *Attorney, Agent, or Firm* — Murphy, Bilak & Homiller, PLLC

(57) ABSTRACT

Secure, authenticated communication is enabled between an initiator (12) (e.g., a user equipment) and a responder (14) (e.g., an authentication server function, AUSF, or a subscription de-concealing function, SIDF). The initiator (12) transmits a message (20) to the responder (14) over a secure communication channel (16). The message (20) may include information indicating a third party (18) whose signing of data (e.g., bound to the secure communication channel (16)) will authenticate the responder (14) to the initiator (12). The responder (14) correspondingly retrieves from the third party (18) data that is signed by the third party (18) and transmits a response (24) to the initiator (12) that includes the retrieved data. The initiator (12) receives this response (24) and determines whether or not the responder (14) is authenticated by determining whether or not the response (24) includes data that is signed by the third party (18).

23 Claims, 9 Drawing Sheets

(58) Field of Classification Search
USPC .............................................. 726/7
See application file for complete search history.

(56) References Cited

U.S. PATENT DOCUMENTS

| | | |
|---|---|---|
| 2012/0020343 A1 | 1/2012 | Sugizaki et al. |
| 2016/0094542 A1* | 3/2016 | Lee .................... H04W 12/069 |
| | | 726/7 |
| 2019/0149521 A1* | 5/2019 | Jerichow ............... H04L 9/3226 |
| | | 713/171 |
| 2019/0150223 A1* | 5/2019 | Gundavelli ............. H04W 4/02 |
| | | 713/161 |

OTHER PUBLICATIONS

3GPP, "3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.

Kaufman, C., et al., "Internet Key Exchange Protocol Version 2 (IKEv2)", Internet Engineering Task Force (IETF), Request for Comments: 7296, STD: 79, Standards Track, Oct. 2014, 1-142.

\* cited by examiner

SECURED AUTHENTICATED COMMUNICATION BETWEEN AN INITIATOR AND A RESPONDER

TECHNICAL FIELD

The present application relates generally to secured, authenticated communication and relates more specifically to secured, authenticated communication between an initiator and a responder.

BACKGROUND

Protocols such as the Internet Key Exchange (IKE) protocol help two parties to mutually authenticate one another and securely communicate, so as to ensure data confidentiality and/or integrity. In version 2 of the IKE protocol, for example, a so-called initiator initiates negotiation with a responder regarding which cryptographic algorithm, keying material, and other parameters will be used to protect communication between the initiator and the responder. This negotiation effectively establishes a secure control channel (also referred to as a security association) between the initiator and the responder. The initiator and the responder next authenticate one another in a way that ensures the already negotiated control channel is bound to the authenticated entities. The initiator and responder can then use the secure control channel to establish a secure "traffic" channel (e.g., in the form of an Internet Protocol, IP, Security tunnel) for exchanging data securely.

IKE and other protocols may require public-key-signature-based authentication under some circumstances, e.g., if the Extensible Authentication Protocol (EAP) is used to set up an IPSec tunnel. This require the parties to exchange certificates (and certificate chains) with one another. Certificates however can be quite large (e.g., several kilobytes) and the certificate chain to the root-of-trust can also be long, e.g., when multiple intermediate certificate authorities are involved. This proves problematic because some entities may not be capable of handling such lengthy certificates or certificate chains, especially not in an efficient way. For example, some entities may not support fragmenting the lengthy certificates or certificate chains at the IP layer, or may not support technologies that would avoid such fragmentation.

SUMMARY

Some embodiments herein enable secured, authenticated communication between an initiator and a responder by exploiting a third party (that is not a certificate authority) for authentication of the responder to the initiator. The initiator may authenticate the responder for instance if the responder sends the initiator data that is signed by the third party, e.g., and that is bound to a secure communication channel between the initiator and the responder. The initiator may thereby base authentication of the responder on the third party's signature, in lieu of the responder's own signature. Especially in embodiments where the initiator already has a public key with which to verify the third party's signature (e.g., where the third party is the initiator's home network), this may free the initiator from having to retrieve the potentially lengthy certificate and certificate chain of the responder. Some embodiments may therefore avoid fragmentation attributable to lengthy certificates and certificate chains, provide authentication using an approach that is widely deployable without the need for supporting or avoiding fragmentation, and reduce the memory and processing that the initiator requires for authentication of the responder.

More particularly, embodiments herein include a method for enabling secured, authenticated communication between an initiator and a responder. The method as performed by the initiator includes transmitting a message from the initiator to the responder over a secure communication channel established between the initiator and the responder. In some embodiments, the message includes information indicating a third party whose signing of data (e.g., bound to the secure communication channel) will authenticate the responder to the initiator. The method may also include receiving, at the initiator and over the secure communication channel, a response to the message from the responder. The method may further include determining, at the initiator, whether or not the responder is authenticated by determining whether or not the response includes data (e.g., that is bound to the secure communication channel and) that is signed by the third party. The method in some embodiments may also include, after the responder is authenticated to the initiator, negotiating, on behalf of a security service (e.g., IPSec), one or more security associations (e.g., an IPSec SA) for a secure traffic channel between the initiator and the responder.

In some embodiments, determining whether or not the response includes data that is signed by the third party comprises using a public key of the third party to determine whether or not the response includes data that is signed with a private key of the third party.

Embodiments herein also include a method for enabling secured, authenticated communication between an initiator and a responder. The method as performed by the responder includes receiving a message from the initiator over a secure communication channel established between the initiator and the responder. In some embodiments, the message includes information indicating a third party whose signing of data (e.g., bound to the secure communication channel) will authenticate the responder to the initiator. The method may also include retrieving from the indicated third party data (e.g., that is bound to the secure communication channel) and that is signed by the third party. The method may further include transmitting, by the responder and over the secure communication channel, a response to the message that includes the retrieved data (e.g., that is bound to the secure communication channel and) that is signed by the third party. In some embodiments, the method also includes, after the responder is authenticated to the initiator, negotiating, on behalf of a security service (e.g., IPSec), one or more security associations (e.g., an IPSec SA) for a secure traffic channel between the initiator and the responder.

In either of the methods above, the message may be an IKE_AUTH request message according to an Internet Key Exchange, IKE, protocol and/or the response may be an IKE_AUTH response to the IKE_AUTH request message. Alternatively or additionally, the initiator may be an IKE initiator and the responder may be an IKE responder. Also in either of the methods, the message may further indicate that an Extensible Authentication Protocol, EAP, is to be used for authenticating at least the initiator to the responder.

Embodiments herein further include a method for enabling secured, authenticated communication between an initiator and a responder. The method as performed by third party equipment of a third party includes receiving, at the third party equipment and from the responder, a request that includes data (e.g., bound to a secure communication channel established between the initiator and the responder) and that requests the third party to sign the data. The method may further include signing the data at the third party equipment and transmitting the signed data from the third party equipment towards the responder in response to the request.

Note that the data described in any of the methods in some embodiments includes or is a function of at least some data exchanged between the initiator and the responder as part of establishing the secure communication channel. In one embodiment, for instance, the data comprises an authentication payload formed from at least a portion of a message that the responder sent to the initiator as part of establishing the secure communication channel. Alternatively or additionally, the data may include or be a function of one or more of: a shared secret resulting from establishment of the secure communication channel; one or more freshness parameters exchanged as part of establishing the secure communication channel; and an identity of the responder and/or an identity of the initiator.

In still further embodiments, the data described above may comprises a random number signed with a key derived from a shared secret SKEYSEED. The shared secret SKEYSEED may for instance be calculated from one or more nonces exchanged between the initiator and the responder as part of establishing the secure communication channel and from a Diffie-Hellman shared secret or an Elliptic Curve Diffie-Hellman shared secret between the initiator and the responder.

In some embodiments, the initiator is configured, prior to establishment of the secure communication channel, with a public key of the third party with which to verify whether the third party has signed the data.

Note that the initiator in any of the above embodiments may be a wireless communication device (also referred to as simply a wireless device). In one or more of these embodiments, the third party may be a home network of the wireless device. Alternatively or additionally, the third party may be represented by network equipment that implements an AUSF or SIDF. Or the third party may be represented by network equipment that implements an UDM or HSS. In still other embodiments, the responder may comprise network equipment that implements a N3IWF or an ePDG via which the initiator connects to a 3GPP core network over a non-3GPP access network.

Embodiments herein also include corresponding apparatus, computer programs, and carriers (e.g., non-transitory computer readable mediums). For example, embodiments include an initiator for enabling secured, authenticated communication between the initiator and a responder. The initiator is configured to transmit a message from the initiator to the responder over a secure communication channel established between the initiator and the responder. In some embodiments, the message includes information indicating a third party whose signing of data (e.g., bound to the secure communication channel) will authenticate the responder to the initiator. The initiator may also be configured to receive, at the initiator and over the secure communication channel, a response to the message from the responder. The initiator may further be configured to determine, at the initiator, whether or not the responder is authenticated by determining whether or not the response includes data (e.g., that is bound to the secure communication channel and) that is signed by the third party. The initiator in some embodiments may also be configured to, after the responder is authenticated to the initiator, negotiate, on behalf of a security service (e.g., IPSec), one or more security associations (e.g., an IPSec SA) for a secure traffic channel between the initiator and the responder.

Embodiments also include a responder for enabling secured, authenticated communication between an initiator and the responder. The responder is configured to receive a message from the initiator over a secure communication channel established between the initiator and the responder. In some embodiments, the message includes information indicating a third party whose signing of data (e.g., bound to the secure communication channel) will authenticate the responder to the initiator. The responder may also be configured to retrieve from the indicated third party data (e.g., that is bound to the secure communication channel and) that is signed by the third party. The responder may further be configured to transmit, by the responder and over the secure communication channel, a response to the message that includes the retrieved data (e.g., that is bound to the secure communication channel and) that is signed by the third party. In some embodiments, the responder is also configured to, after the responder is authenticated to the initiator, negotiate, on behalf of a security service (e.g., IPSec), one or more security associations (e.g., an IPSec SA) for a secure traffic channel between the initiator and the responder.

Embodiments further include third party equipment of a third party for enabling secured, authenticated communication between an initiator and a responder. The third party equipment is configured to receive, at the third party equipment and from the responder, a request that includes data (e.g., bound to a secure communication channel established between the initiator and the responder) and that requests the third party to sign the data. The third party equipment may further be configured to sign the data at the third party equipment and transmit the signed data from the third party equipment towards the responder in response to the request.

DETAILED DESCRIPTION

Figure 1:
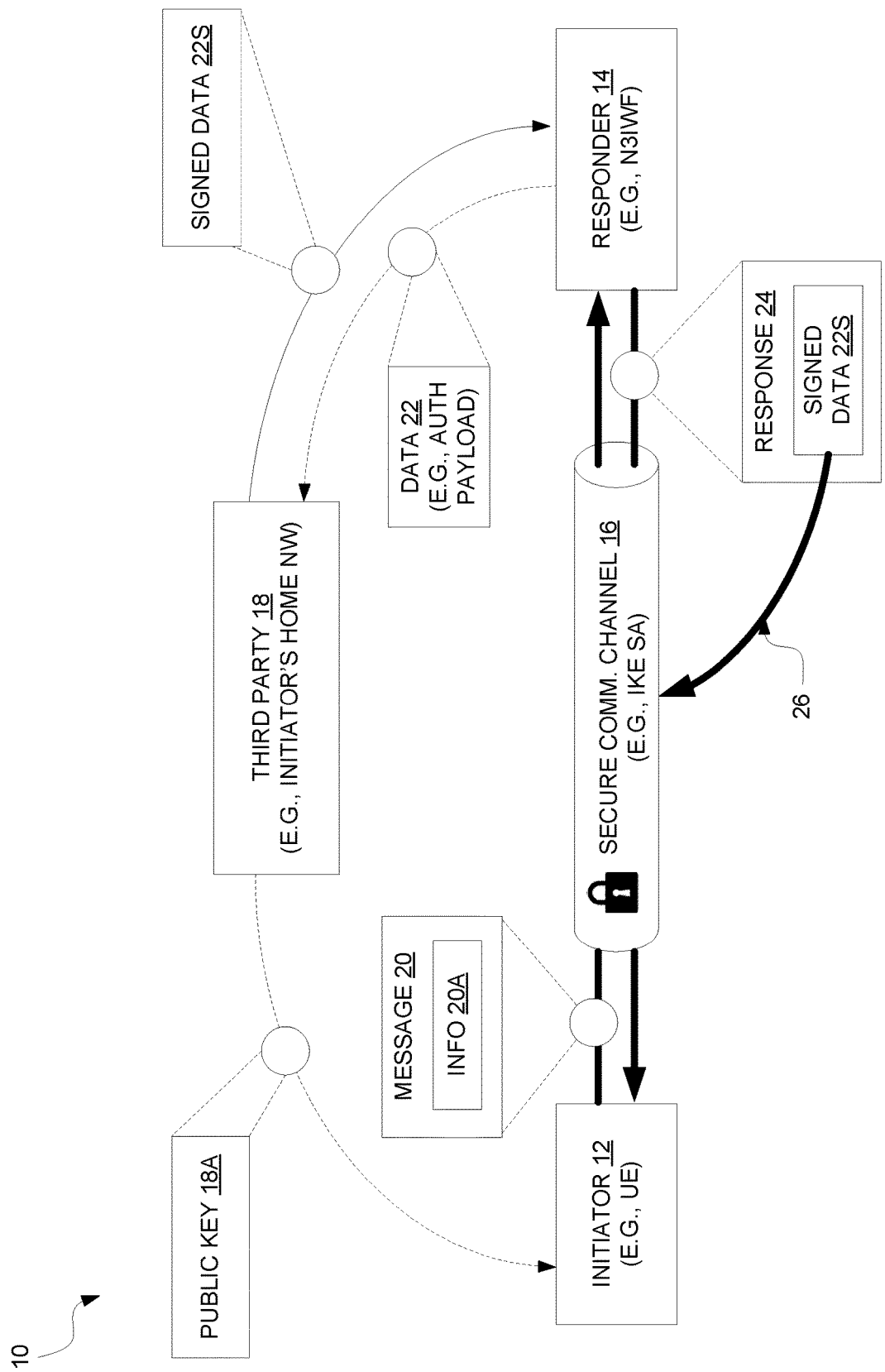
FIG. 1 is a block diagram of a communication system that includes an initiator and a responder according to some embodiments.

FIG. 1 shows a communication system 10 that according to some embodiments enables secure, authenticated communication between an initiator 12 and a responder 14. In one context, the initiator 12 is a wireless device (e.g., a user equipment) and the responder 14 is a network node that implements a non-3GPP interworking function (N3IWF) or an enhanced packet data gateway (ePDG) which the wireless device uses to access a 3GPP core network via a non-3GPP access network. In this context, some embodiments enable secure, authenticated communication between the wireless device and the N3IWF (or ePDG) via an untrusted non-3GPP access network.

No matter the particular context, though, the initiator 12 initiates negotiation of security parameters (e.g., a cryptographic suite) with the responder 14 in order to establish a secure communication channel 16 between the initiator 12 and the responder 14. In embodiments where the negotiation is performed via the Internet Key Exchange, IKE, protocol, for example, the secure communication channel 16 may constitute an IKE security association (SA) between the initiator 12 in the form of an IKE initiator and the responder 14 in the form of an IKE responder. Regardless, the initiator 12 and the responder 14 then authenticate one another in a way bound to the already negotiated secure communication channel 16.

Some embodiments in this regard advantageously exploit a third party 18 for authentication of the responder 14 to the initiator 12. In one or more such embodiments, the initiator 12 may authenticate the responder 14 based on the responder 14 having obtained the third party's signature. That is, the initiator 12 may base authentication of the responder 14 on the third party's signature, in lieu of the responder's own signature. This may prove especially advantageous in some embodiments where the initiator 12 is already pre-configured with a public key 18A of the third party 18, e.g., prior to establishment of the secure communication channel 16 and/or based on a pre-existing trust relationship between the initiator 12 and the third party 18. Such may be the case for instance in embodiments where the third party 18 is the initiator's home network. Indeed, in these and other embodiments, the initiator 12 is freed from having to retrieve the potentially lengthy certificate and certificate chain of the responder 14 itself, e.g., dynamically in the midst of IKE procedures. Some embodiments may therefore avoid fragmentation attributable to lengthy certificates and certificate chains, provide authentication using an approach that is widely deployable without the need for supporting or avoiding fragmentation, and reduce the memory and processing that the initiator requires for authentication of the responder 14.

In any event, FIG. 1 illustrates additional details for basing responder authentication on the third party's signature according to some embodiments. As shown, the initiator 12 in some embodiments transmits a message 20 to the responder 14 over the secure communication channel 16 established between the initiator 12 and the responder 14. The message 20 may include information 20A indicating a third party 18 whose signature will authenticate the responder 14 to the initiator 12. In some embodiments, the information 20A may indicate a single third party whose signature will authenticate the responder 14. In other embodiments not elaborated on, though, the information 20A may indicate multiple different third parties from which the responder 14 may choose, where the signature of any one of the indicated third parties will authenticate the responder 14 to the initiator 12.

Regardless, the responder 14 as shown obtains the third party's signature in order to authenticate itself to the initiator 12. In particular, the responder 14 retrieves "signed" data 22S, i.e., data that is signed by the third party 18. The responder 14 may do so for instance by transmitting unsigned data 22 to the third party 18, e.g., within a request for the third party 18 to sign the provided data 22 and return the resulting signed data 22S. No matter how the responder 14 retrieves the signed data 22S, the responder 14 then transmits a response 24 to the initiator's message 20 over the secure communication channel 16. The response 24 includes the retrieved signed data 22S. The initiator 12 correspondingly determines whether or not the responder 14 is authenticated, by determining whether or not the response 24 includes data 22S that is signed by the third party 18.

In some embodiments, the initiator's acceptance of the third party's signature for authentication of the responder 14 is inherently founded on its trust of the third party 18. In this case, the initiator 12 trusts that the third party 18 will not sign any data for a responder that the third party 18 itself does not trust or has not authenticated itself. If the third party 18 trusts or authenticates a responder and as a result signs data for that responder, then the initiator 12 is configured to likewise authenticate the responder.

Note though that the initiator 12 in some embodiments is configured to ensure that the response 24 with the third party's signature is received from the same responder 14 with which the initiator 12 has established the secure communication channel 16, i.e., rather than a man-in-the-middle. In these and other embodiments, the initiator 12 requires the third party 18 to sign data that is bound to the secure communication channel 16 in order for the third party's signature on that data to authenticate the responder 14 to the initiator 12. The message 20 that the initiator 12 transmits to the responder 14 therefore may more particularly include information 20A indicating a third party 18 whose signing of data bound to the secure communication channel 16 will authenticate the responder 14 to the initiator 12. And the responder 14 may correspondingly retrieve and respond to the initiator 12 with signed data 22S that is bound to the secure communication channel 16 and that is signed by the third party 18. Upon receiving the response 24 from the responder 14, the initiator 12 determines whether or not the responder 14 is authenticated, by determining whether or not the response 24 includes data 22S that is bound to the secure communication channel 16 and that is signed by the third party 18. That is, the initiator 12 may check not only that the data 22S is signed by the third party 18, but also that the data 22S is bound to the secure communication channel 16. If either of these checks fail, the initiator 12 may be configured to reject or deny authentication of the responder 14.

In some embodiments, the data 22S may be bound to the secure communication channel 16 in the sense that the data includes or is a function of at least some data exchanged between the initiator 12 and the responder 14 as part of establishing the secure communication channel 16. The data 22S may for instance comprise an authentication payload (e.g., an IKE AUTH payload) formed from at least a portion of a message that the responder 14 sent to the initiator 12 as part of establishing the secure communication channel 16. In other embodiments, the data 22S may alternatively or additionally include or be a function of one or more freshness parameters (e.g., one or more random numbers, nonces, counters, or the like) exchanged as part of establishing the secure communication channel 16. Alternatively or additionally, the data 22S may include or be a function of an identity of the responder 14 and/or an identity of the initiator 12, e.g., that were exchanged between the initiator 12 and the responder 14 as part of establishing the secure communication channel 16. In still other embodiments, the data 22S may alternatively or additionally include or be a function of a shared secret resulting from establishment of the secure communication channel. Such a shared secret may for instance be a Diffie-Hellman shared secret, an Elliptic Curve Diffie-Hellman shared secret, or an IKE SKEYSEED shared secret. In yet other embodiments, the data 22S may include or be a function of a combination of the above. For example, the data 22S may include or be a function of a random number signed with a key that is derived from a shared secret (e.g., IKE SKEYSEED) between the initiator 12 and the responder 14.

No matter the particular form or substance of the data 22S to be signed by the third party 18, successful authentication of the responder 14 to the initiator 12 based on the third party's signature may trigger or otherwise precede setup of a secure traffic channel (not shown) between the initiator 12 and the responder. In some embodiments, for instance, after the responder 14 is authenticated to the initiator 12, the initiator 12 and responder 14 may negotiate, on behalf of a security service, one or more security associations for a secure traffic channel between the initiator 12 and the responder 14. Where the security service is an IPSec service, for instance, such may facilitate the setup of an IPSec tunnel between the initiator 12 and the responder 14.

Consider an example context in which security for non-3GPP access by a user equipment (UE) to a 5G core network is achieved by a procedure using IKEv2 (e.g., as defined in RFC 7296) to set up one or more IPSec encapsulating security payload (ESP) security associations. In this context, the role of the initiator 12 (or client) is taken by the UE, and the role of the responder 14 (or server) is taken by a non-3GPP interworking function (N3IWF).

In 5G, the UE is preconfigured with or otherwise stores the public key of the UE's home network. The UE may use this public key for various functions, such as identity protection of the Subscription Permanent Identifier (SUPI) to make it a Subscription Concealed Identifier (SUCI). According to some embodiments herein, the UE in its role as IKE initiator exploits this home network public key also for authentication of the N3IWF in its role as IKE responder. The UE may do so for instance by using the home network public key to verify that data from the N3IWF is signed by the private key of the home network.

Figure 2:
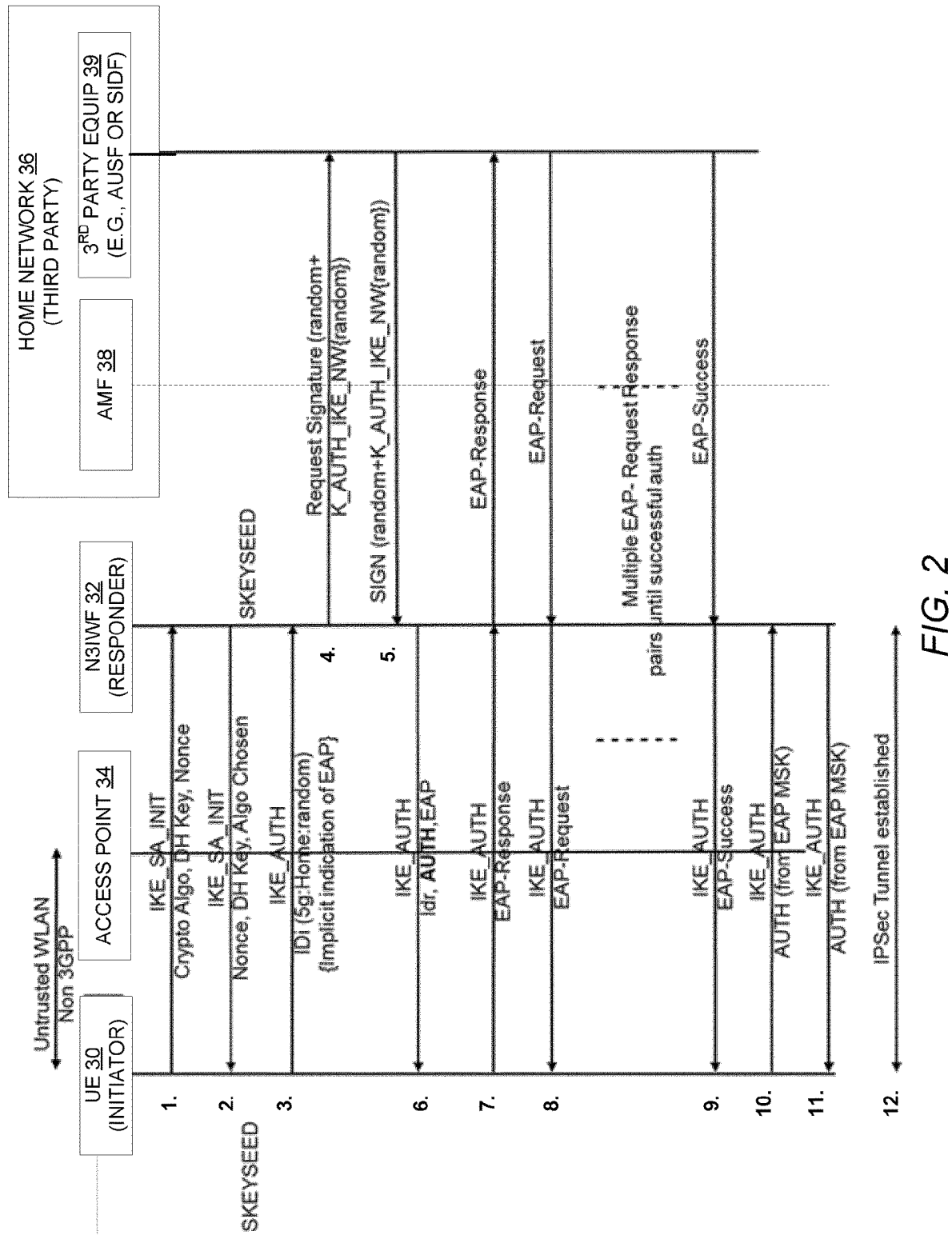
FIG. 2 is call flow diagram of a process for setting up an IPSec tunnel between a user equipment (UE) as an initiator and a non-3GPP interworking function (N3IWF) as a responder according to some embodiments.

FIG. 2 in this regard shows one example of a message sequence for establishing an IPSec tunnel between the UE and N3IWF via untrusted non-3GPP access (e.g., WLAN), where the message 20 in FIG. 1 is an IKE_AUTH request message and the response 24 in FIG. 1 is an IKE_AUTH response to the IKE_AUTH request message. More particularly, in step 1 of FIG. 2, the UE 30 in its role as IKE initiator first sends an IKE_SA_INIT message to the N3IWF 32 in its role as IKE responder, via an access point 34 of an untrusted WLAN. The IKE_SA_INIT message contains the cryptographic algorithms that the UE 30 supports for the IKE SA (Security Association), its public Diffie-Hellman value and its Nonce. In step 2, the N3IWF 32 responds to this message with an IKE_SA_INIT message containing the chosen cryptographic suite from the UE's offered choices, its public Diffie-Hellman value and its Nonce. This first pair of messages (IKE_SA_INIT) thereby negotiates cryptographic algorithms, exchange nonces, and does a Diffie-Hellman exchange. At this stage, then, both the UE 30 and N3IWF 32 derive a (currently unauthenticated) shared secret called SKEYSEED. The UE 30 and N3IWF 32 derive keys from the SKEYSEED and use those derived keys to establish a secure communication channel in the form of an IKE Security Association (SA) over which to send subsequent messages that are encrypted and integrity protected.

At this point, though, the keys have been established via the IKE_SA_INIT exchange without authentication. Therefore, in order to make sure that the keys are bound to the authenticated entities, the UE 30 and N3IWF 32 also authenticate the IKE_SA_INIT messages sent in the previous exchange.

More particularly in this regard, the UE 30 in Step 3 sends an IKE_AUTH message to the N3IWF 32. The UE 30 in doing so asserts its identity with an IDi payload of the IKE_AUTH message. In some embodiments, the IKE_AUTH message in step 3 also implicitly indicates that the extensible authentication protocol (EAP) is to be used for authenticating the UE 30 as IKE initiator to the N3IWF 32 as IKE responder. The IKE_AUTH message may implicitly indicate this, for example, by excluding from the message an IKE AUTH payload which would have otherwise proved the UE's knowledge of the secret (SKEYSEED) corresponding to the IDi payload and thereby authenticated the UE 30 to the N3IWF 32.

Especially where the IKE_AUTH message indicates the UE 30 is to be authenticated using EAP, the IKE_AUTH message also indicates the UE's home network 36 whose signing of data bound to the secure communication channel will authenticate the N3IWF 32 to the UE 30. The IKE_AUTH message may indicate the UE's home network 36 for instance using the IDi payload. In some embodiments, for example, the IDi payload includes a random_number that is chosen randomly by the UE 30 and also includes the name of the UE's home network. In other embodiments, the IDi payload includes the SUCI of the UE, part of which indicates the UE's home network. In either case, although not shown in FIG. 2, the IDi payload in some embodiments may also indicate the home network's public key (e.g. in the form of a fingerprint (e.g. a hash) of the public key) which will be used to verify the home network's signature.

In some embodiments, the N3IWF 32 is configured to retrieve the home network's signature for authentication, responsive to the UE 30 indicating its home network in the IKE_AUTH message. In other embodiments, the IKE_AUTH message may also include an indication that the UE is ready to use its home network for authenticating the N3IWF. This indication informs the N3IWF 32 of whether it can request signing from the home network.

In either case, though, the N3IWF 32 upon receiving the IKE_AUTH message determines in FIG. 2 to retrieve the home network's signature for authenticating itself to the UE 30. The N3IWF 32 therefore identifies the UE's home network from the IKE_AUTH message and in step 4 of FIG. 2 sends a request towards the identified home network for the network to sign certain data that is bound to the secure communication channel. The data as shown in FIG. 2 includes the random_number from the IDi payload as well as proof of the knowledge of the shared secret SKEYSEED. As shown in this example, such proof includes the random_number as signed by a key K_AUTH_IKE_NW derived from the SKEYSEED. Such proof of knowledge of the SKEYSEED ensures the UE 30, when verifying the signature, that Diffie-Hellman was performed with the same N3IWF entity from which the signature is received. In other embodiments not shown, though, parameters needed for calculation of an IKE AUTH payload are included in the signature request for signing.

FIG. 2 shows that the N3IWF 32 sends the signature request specifically to an access and mobility function (AMF) 38 in the UE's home network 36. This AMF 38 routes the signature request to home network (NW) equipment 39, e.g., that implements an authentication server function (AUSF), a subscriber identifier de-concealing function (SIDF), a user data manager (UDM), or a home subscriber server (HSS). The home network equipment 39 simply signs the received data with a private key of the home network 36, e.g., at least if the request is coming from a trusted N3IWF 32 or visiting network with which it has a security and business association. In step 5 of FIG. 2, the home network equipment 39 then sends the signed data back in a message towards the N3IWF 32.

The N3IWF 32 in step 6 of FIG. 2 sends a response back to the UE 30 that includes or is a function of the signed data it received from the UE's home network 36. For example, the N3IWF 32 in some embodiments uses the signed data in the IKE AUTH payload of an IKE_AUTH message that the N3IWF 32 sends back to the UE 30 in step 6. As shown, the IKE_AUTH message in step 6 may also include an IDr payload that the N3IWF 32 uses to assert its identity.

The UE 30, which has the public key of the home network 36, verifies that the response from the N3IWF 32 indeed includes data that is signed by the home network 36. For example, the UE 30 may verify whether or not the AUTH payload in the response is signed by the home network 36. If the signature can be verified correctly, the UE 30 also checks that the signed data is bound to the secure communication channel. In the example shown in FIG. 2, for instance, the UE 30 verifies that the response includes the random_number that the UE 30 had included in the IDi payload and that the response also contains the proof of the same SKEYSEED it has established with the N3IWF 32. This could for example be verified by deriving K_AUTH_IKE_NW and checking the random_number is signed with it. If all the checks are successful, the UE 30 can be assured that the N3IWF 32 is trusted and can continue with the rest of the IKEv2 handshake.

As shown, for instance, the UE 30 proceeds the IKEv2 handshake with EAP messages that are protected with the SKEYSEED. The UE 30 and the home network 36 (e.g., AUSF) then exchange multiple EAP Request/Response messages in steps 7-8 to authenticate each other with EAP-AKA' (or any other EAP method supported by the home network 36). After successful authentication, the home network 36 in step 9 sends an EAP-Success to the N3IWF 32 and includes the master session key (MSK) (also referred to as K_N3IWF) resulting from the EAP method. This MSK or K_N3IWF is then used by both the UE 30 and the N3IWF 32 for deriving the AUTH payload in steps 10-11. Once both sides have verified the AUTH payload, the IPSec security association (SA) is established and the IPSec tunnel is ready in step 12.

Notably, in this scenario, the N3IWF 32 does not need to include the CERT field in the IKE_AUTH message it sends to the UE 30, as the UE 39 does not need any additional certificates for verifying the IKE_AUTH message and authenticating the N3IWF 32. Yet the AUTH payload of the IKE_AUTH message still includes public-key-signature-based authentication of the responder (N3IWF 32) and therefore still meets the requirements of RFC 7296. In fact, in this scenario, the UE 30 does not simply authenticate the N3IWF 32 before sending the EAP messages in steps 7-8. Instead, the signature from the home network 36 ensures that the N3IWF 32 is trusted and that it has a secure path to the third party equipment 39 in the home network 36.

Figure 3:
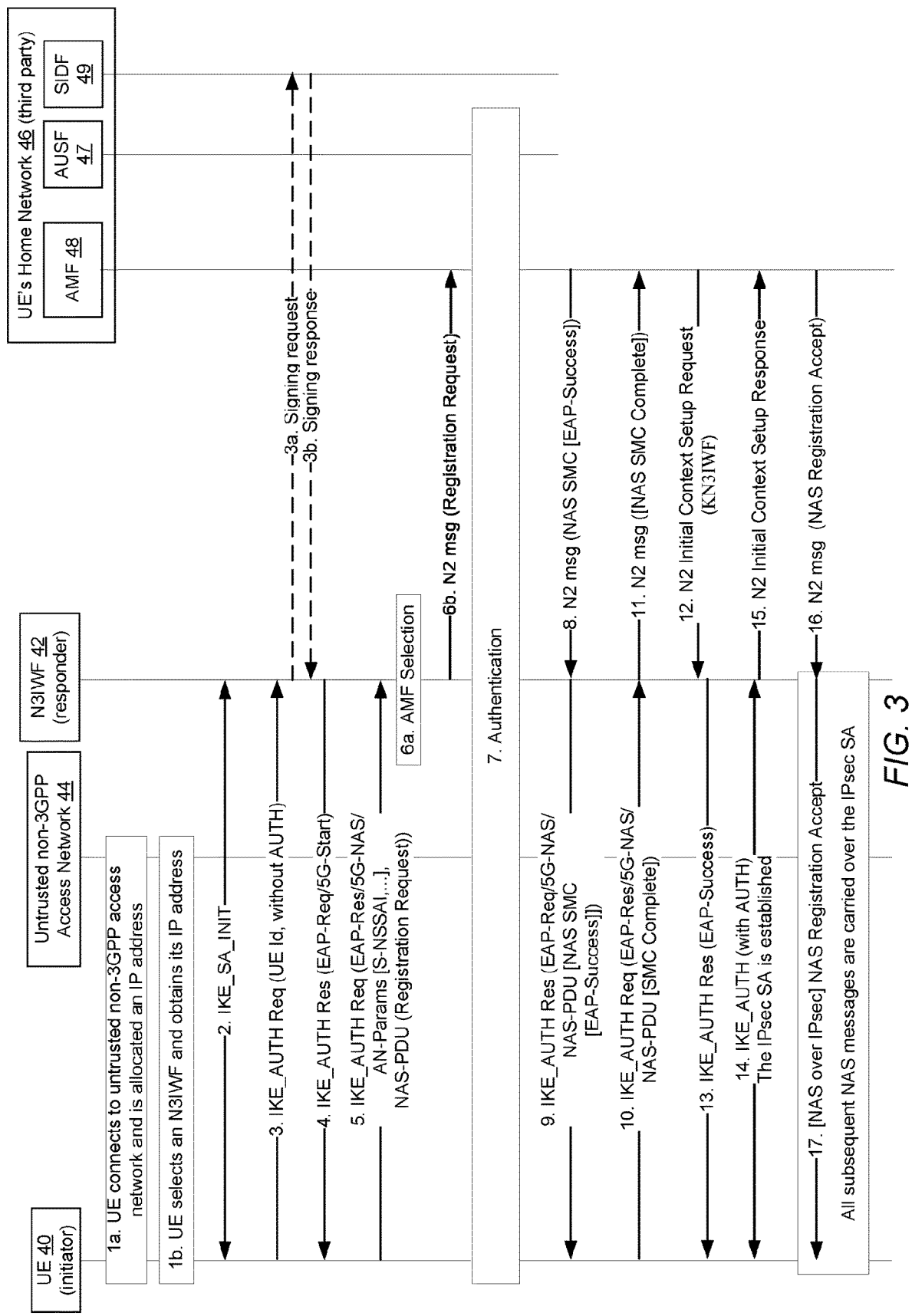
FIG. 3 is call flow diagram of a process for setting up an IPSec tunnel between a user equipment (UE) as an initiator and a non-3GPP interworking function (N3IWF) as a responder according to other embodiments.

FIG. 3 another example of a message sequence for establishing an IPSec tunnel between the UE and N3IWF via untrusted non-3GPP access (e.g., WLAN), again where the message 20 in FIG. 1 is an IKE_AUTH request message and the response 24 in FIG. 1 is an IKE_AUTH response to the IKE_AUTH request message. More particularly, FIG. 3 specifies how a UE 40 is authenticated to a 5G network 46 via an untrusted non-3GPP access network 44. It uses a vendor-specific EAP method called "EAP-5G", utilizing the "Expanded" EAP type and the existing 3GPP Vendor-Id, registered with IANA under the SMI Private Enterprise Code registry. The "EAP-5G" method is used between the UE 40 and the N3IWF 42 and is utilized for encapsulating non-access stratum (NAS) messages. The method is executed between the UE 40 and an AUSF 47 in the UE's home network 46 as shown.

In step 1a of FIG. 3, the UE 40 connects to an untrusted non-3GPP access network 40 with procedures outside the scope of 3GPP. When the UE 40 decides to attach to the 5G core network 46, the UE 40 in step 1b selects an N3IWF 42 in a 5G public land mobile network (PLMN).

In step 2, the UE 40 proceeds with the establishment of an IPsec Security Association (SA) with the selected N3IWF 42 by initiating an IKE initial exchange according to RFC 7296. After step 2, all subsequent IKE messages are encrypted and integrity protected by using the IKE SA established in this step.

In step 3, the UE 40 shall initiate an IKE_AUTH exchange by sending an IKE_AUTH request message to the N3IWF 42. The AUTH payload is not included in the IKE_AUTH request message, which indicates that the IKE_AUTH exchange shall use EAP signaling (in this case EAP-5G signaling). As per the RFC 7296, in the IDi the UE 40 shall set the ID type as ID_KEY-ID in this message and set its value equal to any random number. The UE 40 shall not use its GUTI/SUCI/SUPI as the Id in this step. If the UE 40 is provisioned with the N3IWF 42 root certificate, it shall include the CERTREQ payload within the IKE_AUTH request message to request N3IWF's certificate. If the UE is provisioned with the home network public key, the UE in some embodiments shall include a home network public key identifier and/or a home network identifier in the IKE_AUTH request message. One or both of these identifiers may be included for instance in the CERTREQ payload, in the IDi field, or partly in both. In other embodiments, a more detailed home network identifier such as SUCI may be used.

In step 3a, if the N3IWF 42 received the home network public key identifier and home network identifier in step 3 (and perhaps if the local policy of N3IWF 42 allows), the N3IWF 42 may send a signing request towards the indicated home network 46. The signing request in some embodiments includes the home network public key identifier and the home network identifier and one or more parameters needed to sign the IKEv2 AUTH payload.

In this case, the N3IWF 42 in some embodiments sends the signing request to the AMF 48 of the indicated home network 46. The AMF 48 routes the signing request to the AUSF 47 of the indicated home network 46. The AUSF 46 then routes the signing request to a SIDF 49 of the home network 46. In some embodiments, the SIDF 49 checks whether the signing request is coming from an authorized network and conditions its signing on that check passing. If the check passes in these embodiments, or if the SIDF 49 does not perform this check in other embodiments, the SIDF 49 signs the AUTH payload parameters with its private key corresponding to the received public key identifier. The SIDF 49 in step 3b then sends the signed AUTH payload back towards the N3IWF 42. The SIDF 49 may for instance send the signed AUTH payload in a signing response to the AUSF 47, which is then routed via the AMF 48 to the N3IWF 42. In some embodiments, the signing response may also indicate the public key used. Note also that the mechanism specified in step 3b in some embodiments is intended for both roaming and non-roaming situations.

In step 4, the N3IWF 42 responds with an IKE_AUTH response message which includes the N3IWF identity, an EAP-Request/5G-Start packet, and if the UE 30 has sent a CERTREQ payload in step 3, the AUTH payload to protect the previous message it sent to the UE 30 (in the IKE_SA_INIT exchange). The EAP-Request/5G-Start packet informs the UE to initiate an EAP-5G session, i.e. to start sending NAS messages encapsulated within EAP-5G packets. If the N3IWF 42 used the N3IWF certificate for signing, the N3IWF 42 shall also include the CERT payload including N3IWF certificate. If the AUTH payload was signed by the home network public key, the N3IWF 42 in some embodiments shall also include the home network public key identifier, e.g. in the CERT payload.

In step 5, the UE 40 in some embodiments shall validate the AUTH payload using the N3IWF certificate or the home network public key (depending on which one was indicated) and shall confirm that the N3IWF identity matches the N3IWF selected by the UE 40. An absence of the certificate or home network public key identifier from the N3IWF 42 if the UE 40 had requested the certificate or home network public key or unsuccessful identity confirmation in some embodiments shall result in a connection failure. The UE 40 shall send an IKE_AUTH request which includes an EAP-Response/5G-NAS packet that contains a Registration Request message containing UE security capabilities and the SUCI. If UE 40 is already with the 5GC over 3GPP access and there is an available security context, the UE 40 shall integrity protect the Registration Request message and shall send the 5G-GUTI instead of SUCI. The N3IWF 42 shall refrain from sending an EAP-Identity request. The UE 49 may ignore an EAP Identity request or respond with the SUCI it sent in the Registration Request. Note that the N3IWF 42 does not send an EAP-Identity request because the UE 40 includes its identity in the IKE_AUTH request in message 5.

In step 6, the N3IWF 42 shall select an AMF. The N3IWF 42 forwards the Registration Request received from the UE 40 to the AMF 48.

In step 7, if the AMF 48 receives a 5G-GUTI and the Registration is integrity protected, it may use the security context to verify the integrity protection. If integrity is verified successfully, step 8 to step 11 may be skipped. Otherwise, the AMF 48 shall authenticate the UE 40.

If the AMF decides to authenticate the UE, the AMF 48 shall send a key request to the AUSF 47. The AUSF 47 may initiate a certain authentication procedure. Between AMF 47 and UE 40, the authentication packets are encapsulated within NAS authentication messages and the NAS authentication messages are carried in N2 signaling between the AMF 48 and N3IWF 42, and then are encapsulated within EAP-5G/5G-NAS packets between the N3IWF 42 and the UE 40.

In the final authentication message from the home network 46, the AUSF 47 in some embodiments shall send the anchor key $K_{SEAF}$ derived from $K_{AUSF}$ to the security anchor function (SEAF) (not shown). The SEAF shall derive the $K_{AMF}$ from $K_{SEAF}$ and send it to the AMF 48 which is used by the AMF 48 to derive NAS security keys. If EAP-AKA' is used for authentication, then the AUSF 47 shall include the EAP-Success. The UE 40 also derives the anchor key $K_{SEAF}$ and from that key it derives the $K_{AMF}$ followed by NAS security keys. The NAS COUNTs associated with NAS connection identifier "1" are set at the UE 40 and AMF 48.

In step 8, the AMF 48 shall send a Security Mode Command (SMC) to the UE 40 in order to activate NAS security associated with NAS connection identifier "1". This message is first sent to N3IWF 42 (within an N2 message). If EAP-AKA' is used for authentication, the AMF 48 shall encapsulate the EAP-Success received from AUSF 47 within the SMC message.

In step 9, the N3IWF 42 shall forward the NAS SMC to UE 40 within an EAP-Request/5G-NAS packet.

In step 10, the UE 40 completes the authentication (if initiated in step 7) and creates a NAS security context. The UE 40 shall respond to the NAS SMC it received from the AMF 48 based on the selected algorithms and parameters. The UE 40 shall encapsulate the NAS SMC Complete in the EAP-5G Response.

In step 11, the N3IWF 42 shall forward the NAS packet containing NAS SMC Complete to the AMF 48 over the N2 interface.

In step 12, the AMF 48 upon reception of the NAS SMC Complete from the UE 40 or upon success of integrity protection verification, initiates the NGAP procedure to set up the AN context. The AMF 48 shall compute the N3IWF key, $K_{N3IWF}$, using the uplink NAS COUNT associated with NAS connection identifier "1" for the establishment of the IPsec SA between the UE 40 and the N3IWF 42 and shall include it in the NGAP Initial Context Setup Request sent to the N3IWF 42.

In step 13, the N3IWF 42 sends an EAP-Success/EAP-5G to the UE 40 upon reception of the NGAP Initial Context Setup Request containing the N3IWF key, KN3IWF. This completes the EAP-5G session and no further EAP-5G packets are exchanged. If the N3IWF 42 does not receive the $K_{N3IWF}$ from AMF 48, the N3IWF 42 shall respond with an EAP-Failure.

In step 14, the IPsec SA is established between the UE 40 and N3IWF 42 by using the N3IWF key $K_{N3IWF}$ that was created in the UE 40 using the uplink NAS COUNT associated with NAS connection identifier "1" and was received by N3IWF 42 from the AMF 48 in step 12.

In step 15, upon successful establishment of the IPsec SA between the UE 40 and the N3IWF 42, the N3IWF 42 shall send the NGAP Initial Context Setup Response message to the AMF 48.

In step 16, when NGAP Initial Context Setup Response for the UE 40 is received by the AMF 48, the AMF 48 shall send the NAS Registration Accept message for the UE 40 over the N2 towards the N3IWF 42.

In step 17, upon receiving the NAS Registration Accept message from the AMF 48, the N3IWF 42 shall forward it to the UE 40 over the established IPsec SA. All further NAS messages between the UE 40 and the N3IWF 42 shall be sent over the established IPsec SA.

Note that although the above examples have described the third party 18 whose signature verifies the responder (e.g., N3IWF) to the initiator (e.g., UE) as being the initiator's home network (e.g., as represented by certain equipment in that network), in other embodiments the third party 18 may be a serving or visited network of the initiator. In this case, then, the third party in the embodiments shown in FIGS. 2 and/or 3 may be the serving or visited network of the initiator, instead of the home network. Notably, though, the third party 18 is not a certificate authority (CA) in any embodiment, since inclusion of such a CA would frustrate an objective of some embodiments to avoid certificate chains.

Generally, then, a third party 18 herein is any party other than the initiator 12, the responder 14, or a certificate authority (CA).

Note further that in some embodiments (e.g., that are not concerned with handling inbound roaming UEs) the responder (e.g., N3IWF) is preconfigured with the identity of the third party or the address of the third party equipment, e.g., so as to send all signing requests to that third party or third party equipment. In these and other embodiments, then, the initiator may not need to indicate the third party or third party equipment in its message 20 to the responder.

Alternatively or additionally, the responder in some embodiments is configured to itself deduce or otherwise determine the third party 18 whose signature is needed for authentication. In some embodiments for instance the responder deduces or otherwise determines the third party 18 from the CERTREQ payload in the message 20 (e.g., IKE_INIT_SA message). The CERTREQ payload in this regard may contain an indicator of trust authorities for a certain certificate type. The Certification Authority value may be a concatenated list of SHA-1 hashes of the public keys of trusted CAs. This may be useful for instance if the responder has a list of public keys of corresponding third parties or third party equipments.

Figure 4:
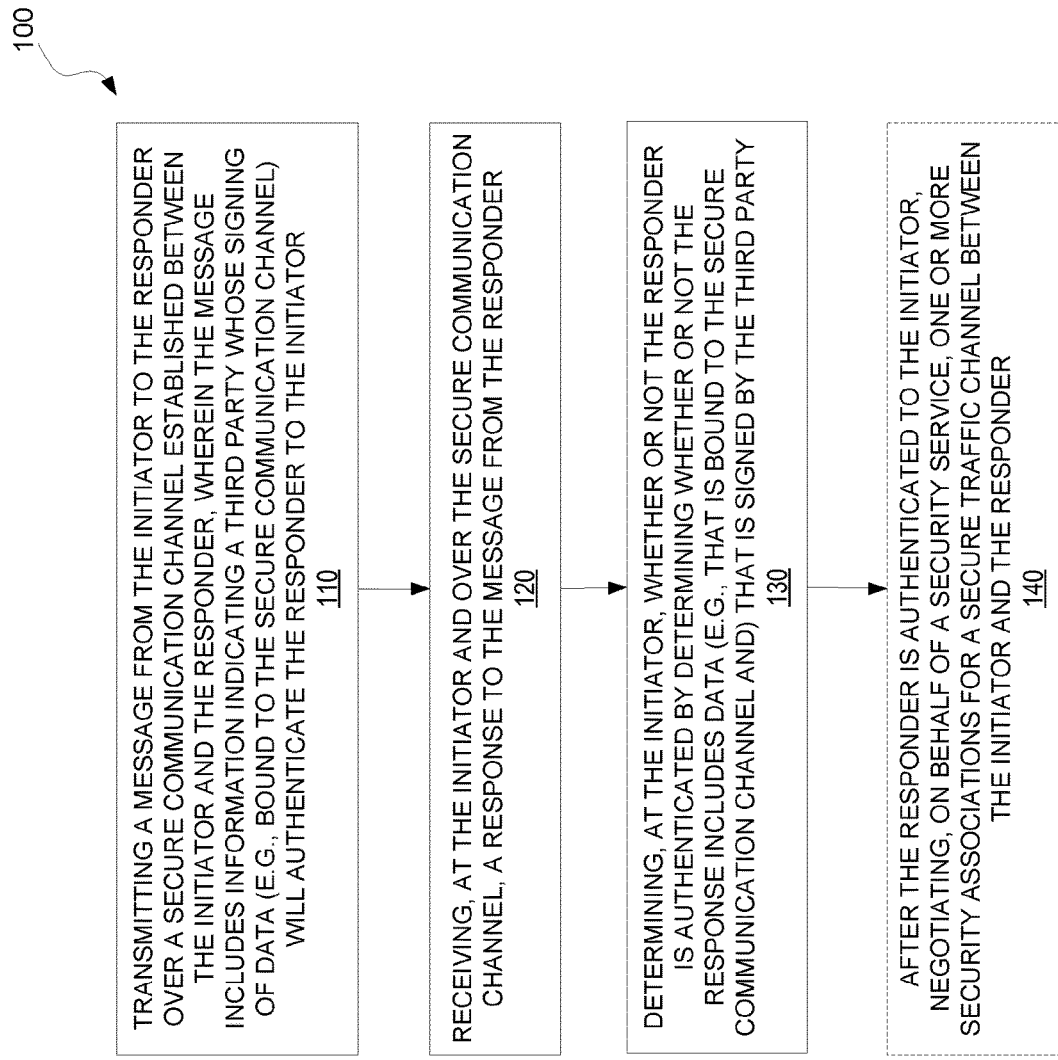
FIG. 4 is a logic flow diagram of a method performed by an initiator according to some embodiments.

In view of the above variations and modifications, the initiator 12 (e.g., UE) in some embodiments generally performs the method 100 shown in FIG. 4 for enabling secured, authenticated communication between the initiator 12 and the responder 14. The method 100 as shown includes transmitting a message 20 from the initiator 12 to the responder 14 over a secure communication channel 16 established between the initiator 12 and the responder 14 (Block 110). In some embodiments such as those shown, the message 20 includes information 20A indicating a third party 18 whose signing of data (e.g., bound to the secure communication channel 16) will authenticate the responder 12 to the initiator 14. The method 100 may also include receiving, at the initiator 12 and over the secure communication channel 16, a response 24 to the message 20 from the responder 14 (Block 120). The method 100 may further include determining, at the initiator 12, whether or not the responder 14 is authenticated by determining whether or not the response 24 includes data 22S (e.g., that is bound to the secure communication channel 16 and) that is signed by the third party 18 (Block 130). The method 100 in some embodiments may also include, after the responder 14 is authenticated to the initiator 12, negotiating, on behalf of a security service (e.g., IPSec), one or more security associations (e.g., an IPSec SA) for a secure traffic channel between the initiator 12 and the responder 14 (Block 140).

Figure 5:
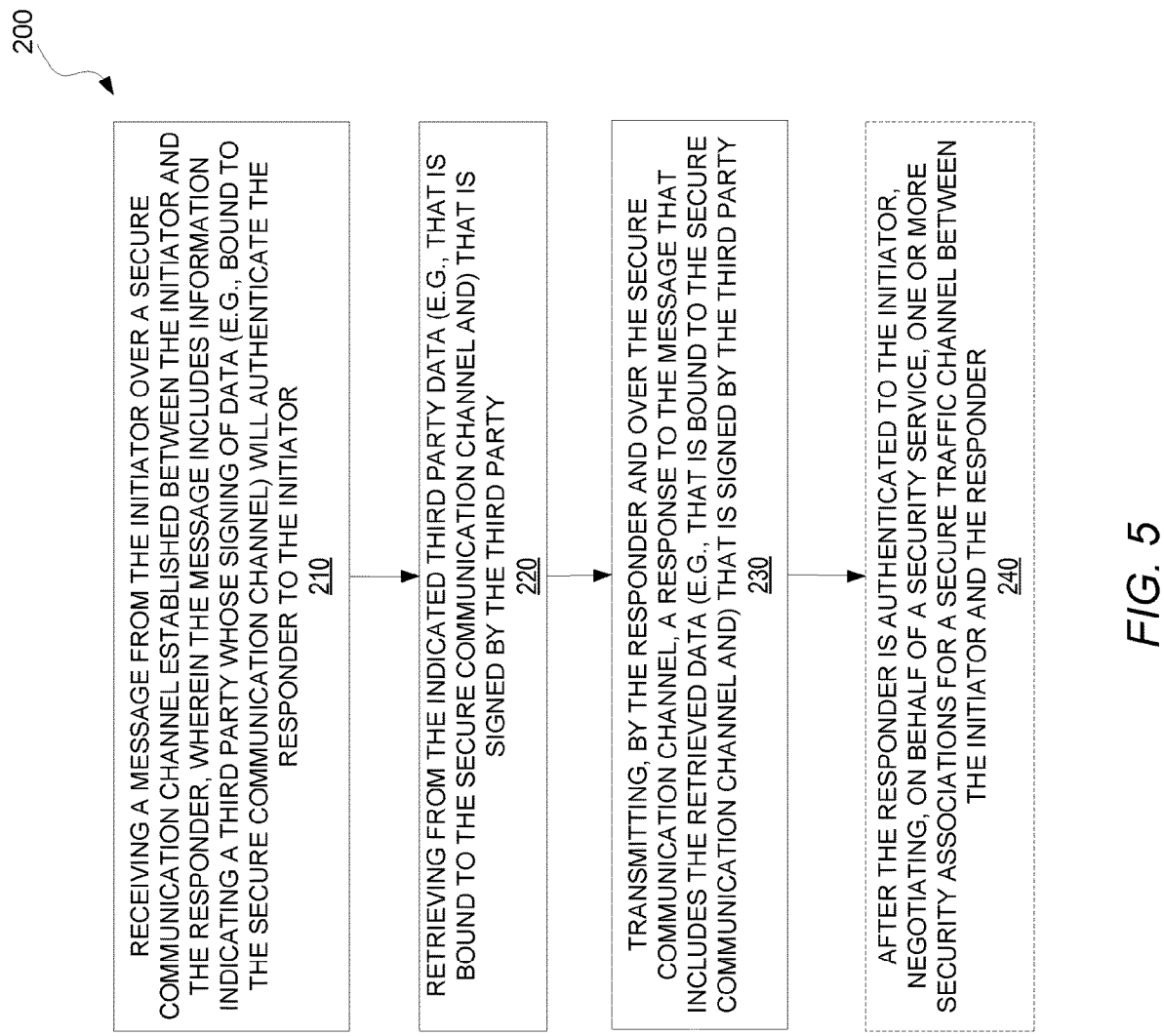
FIG. 5 is a logic flow diagram of a method performed by a responder according to some embodiments.

Also in view of the above variations and modifications, the responder 14 generally performs the method 200 shown in FIG. 5 for enabling secured, authenticated communication between the initiator 12 and the responder 14. The method 200 as shown includes receiving a message 20 from the initiator 12 over a secure communication channel 16 established between the initiator 12 and the responder 13 (Block 210). In some embodiments such as those shown, the message 20 includes information 20A indicating a third party 18 whose signing of data (e.g., bound to the secure communication channel 16) will authenticate the responder 14 to the initiator 12. The method 200 may also include retrieving from the indicated third party 18 data 22S (e.g., that is bound to the secure communication channel 16 and) that is signed by the third party 18 (Block 220). The method 200 may further include transmitting, by the responder 14 and over the secure communication channel 16, a response 24 to the message 20 that includes the retrieved data 22S (e.g., that is bound to the secure communication channel 16 and) that is signed by the third party 18 (Block 230). In some embodiments, the method 200 also includes, after the responder 14 is authenticated to the initiator 12, negotiating, on behalf of a security service (e.g., IPSec), one or more security associations (e.g., an IPSec SA) for a secure traffic channel between the initiator 12 and the responder 14 (Block 240).

In either of the methods 100 or 200 in FIGS. 4 and 5, the message 20 may be an IKE_AUTH request message according to an Internet Key Exchange, IKE, protocol and/or the response 24 may be an IKE_AUTH response to the IKE_AUTH request message. Alternatively or additionally, the initiator 12 may be an IKE initiator and the responder 14 may be an IKE responder. Also in either of the methods 100 or 200 in FIGS. 4 and 5, the message 20 may further indicate that an Extensible Authentication Protocol, EAP, is to be used for authenticating at least the initiator 12 to the responder 14.

Figure 6:
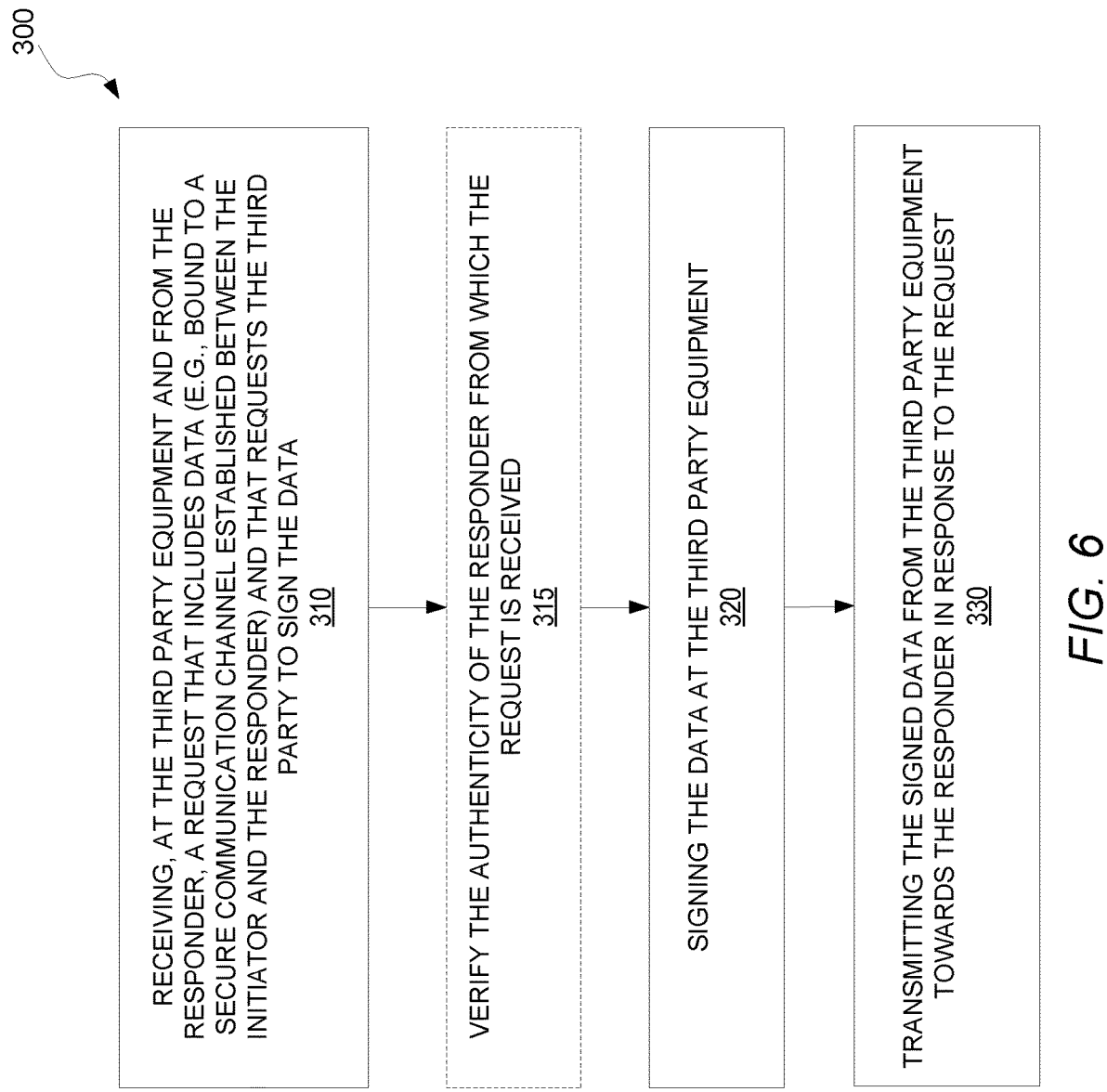
FIG. 6 is a logic flow diagram of a method performed by third party equipment of a third party according to some embodiments.

Further in view of the above variations and modifications, third party equipment of a third party 18 generally performs the method 300 shown in FIG. 6 for enabling secured, authenticated communication between the initiator 12 and the responder 14. The method 300 as shown includes receiving, at the third party equipment and from the responder 14, a request that includes data 22 (e.g., bound to a secure communication channel 16 established between the initiator 12 and the responder 14) and that requests the third party to sign the data 22 (Block 310). In some embodiments, the method 300 may further include verifying the authenticity of the responder 14 from which the request was received, e.g., by checking that the request comes from a trusted responder 14 (Block 315). In this case, the method 300 may proceed if the authenticity of the responder 14 is indeed verified. Regardless, the method 300 may further include signing the data 22 at the third party equipment (Block 320) and transmitting the signed data 22S from the third party equipment towards the responder 14 in response to the request (Block 330).

Note that the data described in any of the methods 100, 200, or 300 in some embodiments includes or is a function of at least some data exchanged between the initiator 12 and the responder 14 as part of establishing the secure communication channel 16. In one embodiment, for instance, the data comprises an authentication payload formed from at least a portion of a message that the responder 14 sent to the initiator 12 as part of establishing the secure communication channel 16. Alternatively or additionally, the data may include or be a function of one or more of: a shared secret on which the secure communication channel 16 is established; one or more freshness parameters exchanged as part of establishing the secure communication channel 16; and an identity of the responder 14 and/or an identity of the initiator 12.

In still further embodiments, the data described above may comprises a random number signed with a key derived from a shared secret SKEYSEED. The shared secret SKEYSEED may for instance be calculated from one or more nonces exchanged between the initiator 12 and the responder 14 as part of establishing the secure communication channel 16 and from a Diffie-Hellman shared secret or an Elliptic Curve Diffie-Hellman shared secret between the initiator 12 and the responder 14.

In some embodiments, the initiator 12 is configured, prior to establishment of the secure communication channel 16, with a public key 18A of the third party 18 with which to verify whether the third party 18 has signed the data. The initiator 12 may for instance have a root certificate for the third party 18.

Note that the initiator 12 in any of the above embodiments may be a wireless communication device (also referred to as simply a wireless device). In one or more of these embodiments, the third party 18 may be a home network of the wireless device. Alternatively or additionally, the third party 18 may be represented by network equipment that implements an AUSF or SIDF. Or the third party 18 may be represented by network equipment that implements an UDM or HSS. In still other embodiments, the responder 14 may comprise network equipment that implements a N3IWF or an ePDG via which the initiator 12 connects to a 3GPP core network over a non-3GPP access network.

Note that the term "data" is used herein as a singular mass noun, e.g., similar to terms such as "luck" or "work" that name something that cannot usually be counted. To the extent that "data" herein is referred to as quantifiable, the "data" may refer to one or more pieces of data.

Note that embodiments herein may use any of one or more communication protocols known in the art or that may be developed, such as IEEE 802.xx, Code Division Multiple Access (CDMA), Wideband CDMA (WCDMA), Global System for Mobile telecommunications (GSM), Long Term Evolution (LTE), WiMax, New Radio (NR), or the like. Accordingly, although sometimes described herein in the context of 5G, the principles and concepts discussed herein are applicable to 4G systems and others.

A wireless device as used herein is any type device capable of communicating with another radio node wirelessly over radio signals. A wireless device may therefore refer to a user equipment (UE), a mobile station, a laptop, a smartphone, a machine-to-machine (M2M) device, a machine-type communications (MTC) device, a narrowband Internet of Things (IoT) device, etc. That said, although the wireless device may be referred to as a UE, it should be noted that the wireless device does not necessarily have a "user" in the sense of an individual person owning and/or operating the device. A wireless device may also be referred to as a wireless communication device, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be generally configured to transmit and/or receive data without direct human interaction.

In an IOT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

As used herein, "network equipment" refers to equipment capable, configured, arranged and/or operable to communicate directly or indirectly with a wireless device and/or with other equipment in a wireless communication network that enables and/or provides wireless access to the wireless device. Examples of network equipment include, but are not limited to, core network equipment in a core network (e.g., equipment that implements an AUSF or SIDF).

Note that the initiator 12 as described above may perform any of the processing herein by implementing any functional means or units. In one embodiment, for example, the initiator 12 comprises respective circuits or circuitry configured to perform the steps shown in FIG. 4. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 7A:
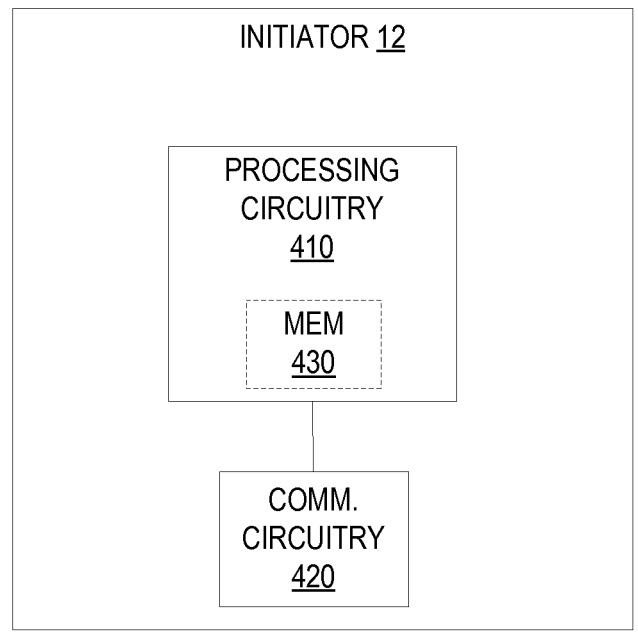
FIG. 7A is a block diagram of an initiator according to some embodiments.

FIG. 7A illustrates the initiator 12 in accordance with one or more embodiments. As shown, the initiator 12 includes processing circuitry 410 and communication circuitry 420. The communication circuitry 420 is configured to transmit and/or receive information to and/or from one or more other nodes, e.g., via any communication technology. The processing circuitry 410 is configured to perform processing described above, e.g., in FIG. 4, such as by executing instructions stored in memory 430. The processing circuitry 410 in this regard may implement certain functional means, units, or modules.

Figure 7B:
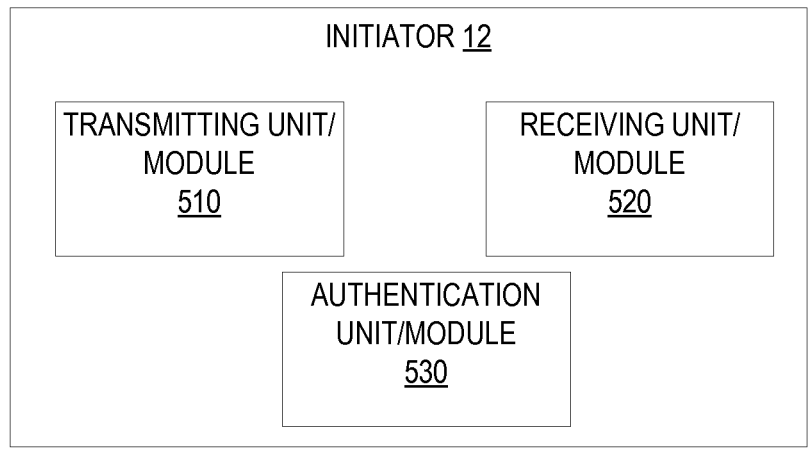
FIG. 7B is a block diagram of an initiator according to other embodiments.

FIG. 7B illustrates the initiator 12 in accordance with one or more other embodiments. As shown, the initiator 12 implements various functional means, units, or modules, e.g., via the processing circuitry 410 in FIG. 7A and/or via software code. These functional means, units, or modules, e.g., for implementing the method 100 in FIG. 4, include for instance a transmitting unit or module 510 for transmitting a message 20 from the initiator 12 to the responder 14 over a secure communication channel 16 established between the initiator 12 and the responder 14. In some embodiments such as those shown, the message 20 includes information 20A indicating a third party 18 whose signing of data (e.g., bound to the secure communication channel 16) will authenticate the responder 12 to the initiator 14. In some embodiments, the initiator 12 may also include a receiving unit or module 520 for receiving, at the initiator 12 and over the secure communication channel 16, a response 24 to the message 20 from the responder 14. Further included may be an authentication unit or module 530 for determining, at the initiator 12, whether or not the responder 14 is authenticated by determining whether or not the response 24 includes data 22S (e.g., that is bound to the secure communication channel 16 and) that is signed by the third party 18.

Also note that the responder 14 as described above may perform any of the processing herein by implementing any functional means or units. In one embodiment, for example, responder 14 comprises respective circuits or circuitry configured to perform the steps shown in FIG. 5. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 8A:
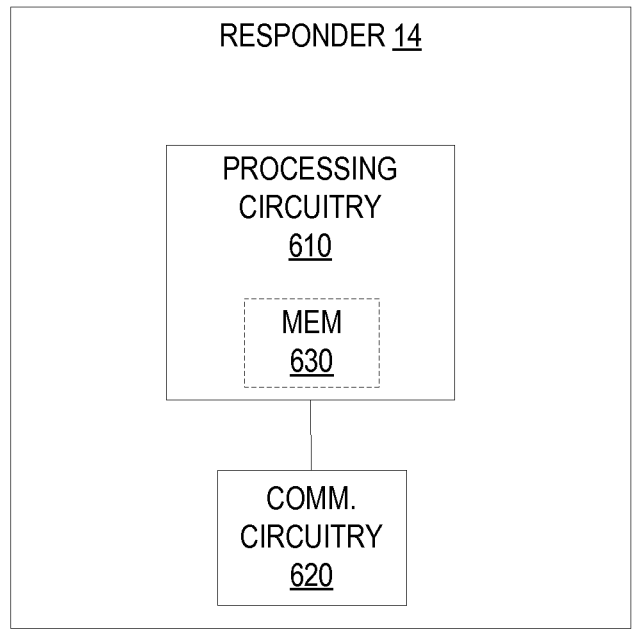
FIG. 8A is a block diagram of a responder according to some embodiments.

FIG. 8A illustrates responder 14 in accordance with one or more embodiments. As shown, the responder 14 includes processing circuitry 610 and communication circuitry 620. The communication circuitry 620 is configured to transmit and/or receive information to and/or from one or more other nodes, e.g., via any communication technology. The processing circuitry 610 is configured to perform processing described above, e.g., in FIG. 5, such as by executing instructions stored in memory 630. The processing circuitry 610 in this regard may implement certain functional means, units, or modules.

Figure 8B:
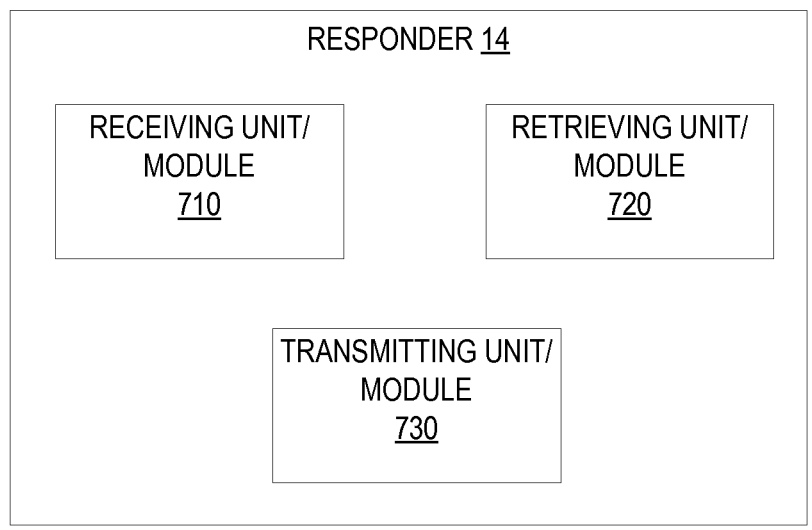
FIG. 8B is a block diagram of a responder according to other embodiments.

FIG. 8B illustrates responder 14 in accordance with one or more other embodiments. As shown, the responder 14 implements various functional means, units, or modules, e.g., via the processing circuitry 610 in FIG. 8A and/or via software code. These functional means, units, or modules, e.g., for implementing the method in FIG. 5, include for instance a receiving unit or module 710 for receiving a message 20 from the initiator 12 over a secure communication channel 16 established between the initiator 12 and the responder 13. In some embodiments such as those shown, the message 20 includes information 20A indicating a third party 18 whose signing of data (e.g., bound to the secure communication channel 16) will authenticate the responder 14 to the initiator 12. Also included may be a retrieving unit or module 720 for retrieving from the indicated third party 18 data 22S (e.g., that is bound to the secure communication channel 16 and) that is signed by the third party 18. Further included may be a transmitting unit or module 730 for transmitting, by the responder 14 and over the secure communication channel 16, a response 24 to the message 20 that includes the retrieved data 22S (e.g., that is bound to the secure communication channel 16 and) that is signed by the third party 18.

Further note that third party equipment of the third party 18 as described above may perform any of the processing herein by implementing any functional means or units. In one embodiment, for example, third party equipment comprises respective circuits or circuitry configured to perform the steps shown in FIG. 6. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 9A:
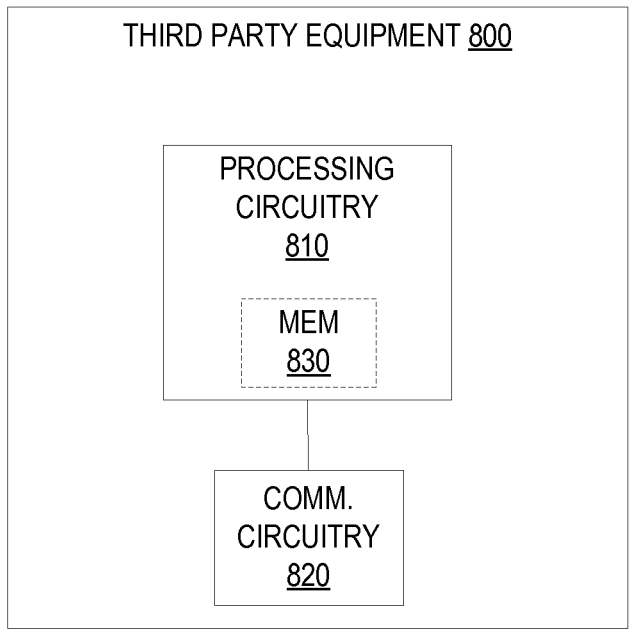
FIG. 9A is a block diagram of third party equipment of a third party according to some embodiments.

FIG. 9A illustrates third party equipment 800 of the third party 18 in accordance with one or more embodiments. As shown, the third party equipment 800 includes processing circuitry 810 and communication circuitry 820. The communication circuitry 820 is configured to transmit and/or receive information to and/or from one or more other nodes, e.g., via any communication technology. The processing circuitry 810 is configured to perform processing described above, e.g., in FIG. 6, such as by executing instructions stored in memory 830. The processing circuitry 810 in this regard may implement certain functional means, units, or modules.

Figure 9B:
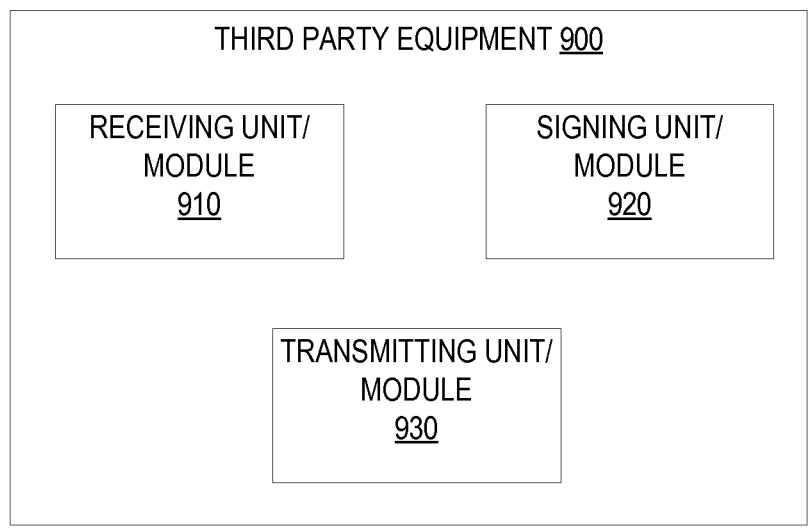
FIG. 9B is a block diagram of third party equipment of a third party according to other embodiments.

FIG. 9B illustrates third party equipment 900 of the third party 18 in accordance with one or more other embodiments. As shown, the third party equipment 900 implements various functional means, units, or modules, e.g., via the processing circuitry 810 in FIG. 9A and/or via software code. These functional means, units, or modules, e.g., for implementing the method in FIG. 6, include for instance a receiving unit or module 910 for receiving, at the third party equipment and from the responder 14, a request that includes data 22 (e.g., bound to a secure communication channel 16 established between the initiator 12 and the responder 14) and that requests the third party to sign the data 22. Also included may be a signing unit or module 920 for signing the data 22 at the third party equipment 900. Further included may be a transmitting unit or module 930 for transmitting the signed data 22S from the third party equipment towards the responder 14 in response to the request.

Those skilled in the art will also appreciate that embodiments herein further include corresponding computer programs.

A computer program comprises instructions which, when executed on at least one processor of the initiator 12, responder 14, or third party equipment, cause the initiator 12, responder 14, or third party equipment to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or (non-transitory) computer readable storage medium.

What is claimed is:

1. A method for enabling secured, authenticated communication between an initiator and a responder, the method performed by the initiator and comprising:
    transmitting a message from the initiator to the responder over a secure communication channel established between the initiator and the responder, wherein the message includes information indicating a third party whose signing of data bound to the secure communication channel will authenticate the responder to the initiator;
    receiving, at the initiator and over the secure communication channel, a response to the message from the responder; and
    determining, at the initiator, whether or not the responder is authenticated by determining whether or not the response includes data that is bound to the secure communication channel and that is signed by the third party.

2. The method of claim 1, wherein said determining comprises using a public key of the third party to determine whether or not the response includes data that is signed with a private key of the third party.

3. The method of claim 1, further comprising, after the responder is authenticated to the initiator, negotiating, on behalf of a security service, one or more security associations for a secure traffic channel between the initiator and the responder.

4. The method of claim 1, wherein the message is an IKE_AUTH request message according to an Internet Key Exchange (IKE) protocol, wherein the response is an IKE_AUTH response to the IKE_AUTH request message, wherein the initiator is an IKE initiator, and the responder is an IKE responder.

5. The method of claim 1, wherein the message further indicates that an Extensible Authentication Protocol (EAP) is to be used for authenticating at least the initiator to the responder.

6. The method of claim 1, wherein the data comprises:
a random number signed with a key derived from a shared secret SKEYSEED, wherein the shared secret SKEYSEED is calculated from one or more nonces exchanged between the initiator and the responder as part of establishing the secure communication channel and from a Diffie-Hellman shared secret or an Elliptic Curve Diffie-Hellman shared secret between the initiator and the responder; and/or
an authentication payload formed from at least a portion of a message that the responder sent to the initiator as part of establishing the secure communication channel.

7. The method of claim 1, wherein the initiator is configured, prior to establishment of the secure communication channel, with a public key of the third party with which to verify whether the third party has signed the data.

8. The method of claim 1, wherein the initiator is a wireless communication device, and wherein the third party is a home network of the wireless communication device.

9. The method of claim 1, wherein:
the third party is represented by network equipment that implements an authentication server function, AUSF, or a subscriber identifier de-concealing function, SIDF; and
the responder comprises network equipment that implements a non-3GPP inter-networking function, N3IWF, or an enhanced packet data gateway, ePDG, via which the initiator connects to a 3GPP core network over a non-3GPP access network.

10. The method of claim 1, wherein the data includes or is a function of at least one of any one or more of:
at least some data exchanged between the initiator and the responder as part of establishing the secure communication channel;
a shared secret resulting from establishment of the secure communication channel;
one or more freshness parameters exchanged as part of establishing the secure communication channel; and
an identity of the responder and/or an identity of the initiator.

11. The of claim 1, wherein the third party is not a certificate authority, and wherein said determining comprises determining, at the initiator, whether or not the responder is authenticated by determining whether or not the response includes data that is bound to the secure communication channel and that is signed by the third party in lieu of a signature of the responder.

12. A method for enabling secured, authenticated communication between an initiator and a responder, the method performed by the responder and comprising:
receiving a message from the initiator over a secure communication channel established between the initiator and the responder, wherein the message includes information indicating a third party whose signing of data bound to the secure communication channel will authenticate the responder to the initiator;
retrieving from the indicated third party data that is bound to the secure communication channel and that is signed by the third party; and
transmitting, by the responder and over the secure communication channel, a response to the message that includes the retrieved data that is bound to the secure communication channel and that is signed by the third party.

13. The method of claim 12, further comprising, after the responder is authenticated to the initiator, negotiating, on behalf of a security service, one or more security associations for a secure traffic channel between the initiator and the responder.

14. The method of claim 12, wherein the message is an IKE_AUTH request message according to an Internet Key Exchange (IKE) protocol, wherein the response is an IKE_AUTH response to the IKE_AUTH request message, wherein the initiator is an IKE initiator, and the responder is an IKE responder.

15. The method of claim 12, wherein the message further indicates that an Extensible Authentication Protocol (EAP) is to be used for authenticating at least the initiator to the responder.

16. The method of claim 12, wherein the data comprises:
a random number signed with a key derived from a shared secret SKEYSEED, wherein the shared secret SKEYSEED is calculated from one or more nonces exchanged between the initiator and the responder as part of establishing the secure communication channel and from a Diffie-Hellman shared secret or an Elliptic Curve Diffie-Hellman shared secret between the initiator and the responder; and/or
an authentication payload formed from at least a portion of a message that the responder sent to the initiator as part of establishing the secure communication channel.

17. The method of claim 12, wherein the initiator is configured, prior to establishment of the secure communication channel, with a public key of the third party with which to verify whether the third party has signed the data.

18. The method of claim 12, wherein the initiator is a wireless communication device, and wherein the third party is a home network of the wireless communication device.

19. The method of claim 12, wherein:
the third party is represented by network equipment that implements an authentication server function, AUSF, or a subscriber identifier de-concealing function, SIDF; and
the responder comprises network equipment that implements a non-3GPP inter-networking function, N3IWF, or an enhanced packet data gateway, ePDG, via which the initiator connects to a 3GPP core network over a non-3GPP access network.

20. The method of claim 12, wherein the data includes or is a function of at least one of any one or more of:
at least some data exchanged between the initiator and the responder as part of establishing the secure communication channel;
a shared secret resulting from establishment of the secure communication channel;
one or more freshness parameters exchanged as part of establishing the secure communication channel; and
an identity of the responder and/or an identity of the initiator.

21. The method of claim 12, wherein the third party is not a certificate authority, and wherein the response is signed by the third party in lieu of a signature of the responder.

22. A method for enabling secure, authenticated communication between an initiator and a responder, the method performed by third party equipment of a third party and comprising:
receiving, at the third party equipment and from the responder, a request that includes data bound to a secure communication channel established between the initiator and the responder and that requests the third party to sign the data;
signing the data at the third party equipment; and
transmitting the signed data from the third party equipment towards the responder in response to the request.

23. The method of claim 22, wherein the initiator is a wireless communication device, and wherein the third party is a home network of the wireless communication device.

\* \* \* \* \*